Patented July 13, 1937

2,087,079

UNITED STATES PATENT OFFICE 2,087,079

PRODUCTION OF N-VINYL COMPOUNDS

Werner Wolff, Ludwigshafen-on-the-Rhine, Germany, assignor to I. G. Farbenindustrie Aktiengesellschaft, Frankfort-on-the-Main, Germany No Drawing. Application January 28, 1936, Serial No. 61,175. In Germany February 6, 1935

9 Claims. (Cl. 260—128)

This invention relates to the production of N-vinyl compounds.

I have found that N-vinyl compounds which are capable of wide industrial employment are obtained by reacting acetylene at elevated temperatures in the presence of alkali metals or alkali metal compounds having a strongly alkaline reaction with secondary N-diarylamines which are free from hydroxy groups. The aryl groups may contain any desired hydrocarbon radicles free from hydroxy groups, as for example methyl, ethyl or phenyl groups. As secondary N-diarylamines of this kind there may be mentioned diphenylamine, phenyl-para-tolyl-amine, alpha-alpha'-dinaphthylamine, phenyl-alpha-naphthylamine, para-tolyl-alpha-naphthylamine and N-phenyl-2-aminoanthracene. Suitable catalysts for the reaction are alkali metal compounds having a strongly alkaline reaction, such as the oxides, hydroxides and alcoholates of the alkali metals, and also the alkali metals themselves, especially metallic potassium. In many cases it is advantageous to employ the said alkali metal compounds together with tertiary heterocyclic bases, such as pyridine and quinoline. For the reaction a pressure-tight vessel, for example, may be employed into which the acetylene (advantageously under increased pressure) is led, preferably in admixture with inert gases, such as nitrogen, methane or hydrogen. The reaction may also be carried out in a tower, the operation being in stages or continuous. In this case, the acetylene is preferably led through the tower in a cycle.

The reaction may be carried out in the presence of diluents, such as alcohols, for example methyl, ethyl or butyl alcohol, glycols, for example ethylene glycol or diethylene glycol, or hydrocarbons, for example cyclohexane, benzene, toluene, tetrahydronaphthalene or decahydronaphthalene. The reaction proceeds most favorably between 100° and 200° C.

The vinyl compounds obtained may be separated from the alkaline substances and purified by distillation, if desired under reduced pressure, by extraction with suitable solvents or by crystallization.

By adding hydrogen to the new N-vinyl compounds, they may be converted into the corresponding aromatic or cycloaliphatic ethyl compounds. The N-vinyl compounds may be polymerized by heating or under the influence of catalysts, whereby valuable artificial masses are obtained. They may be used in the production of azo dyestuffs owing to their coupling ability. Furthermore, they may serve as initial materials for textile assistants and may also find employment in the rubber industry.

The following examples will further illustrate how the present invention may be carried out in practice, but the invention is not restricted to these examples. The parts are by weight.

*Example 1*

A mixture of 100 parts of phenyl-alphanaphthylamine, 10 parts of pyridine and 3 parts of potassium hydroxide in a shaking bomb is treated at from 180° to 190° C. under a pressure of from 15 to 25 atmospheres with acetylene diluted with nitrogen in the ratio of 2:1 until 12 parts of acetylene have been absorbed, which is the case after about three hours. A brown syrup is thus obtained which can be distilled under a pressure of 1 millimeter (mercury gauge) and then has a boiling point of from 168° to 170° C. The liquid thus obtained crystallizes after some time. After dissolution in and precipitation from ammoniacal methanol, pure N-vinyl-phenyl-alpha-naphthylamine which melts at from 80° to 83° C. is obtained.

N-vinyl-phenyl-beta-naphthylamine, which boils at 165° C. at 1 millimeter (mercury gauge) and melts at from 79° to 82° C., can be obtained in a similar manner.

*Example 2*

Acetylene which is diluted with nitrogen in the ratio of 2:1 is allowed to act as described in Example 1 on a mixture of 100 parts of diphenylamine and 1 part of metallic potassium. About 15 parts of acetylene are thus absorbed in the course of three hours. N-vinyl-diphenylamine is obtained in the form of a brown crystal mass which can be purified by distillation under reduced pressure (boiling point from 80° to 108° C. at from 1 to 2 millimeters pressure (mercury gauge)) or by dissolution in ethanol in the presence of a little alkali and crystallization. Colorless leaflets are thus obtained which melt at from 52° to 54° C. The compound is readily decomposable. When allowed to stand in the air it becomes brown in color while partially liquefying and it is colored deep red by oxygen at elevated temperatures.

From 2 to 3 parts of potassium hydroxide may be employed instead of 1 part of metallic potassium. Sodium or sodium hydroxide are also suitable but the absorption of acetylene then proceeds less smoothly.

Example 3

In order to prepare N-vinyl-para-tolyl-alpha-naphthylamine, 12 parts of acetylene are caused to act on 100 parts of para-tolyl-alpha-naphthylamine in the presence of 3 parts of potassium hydroxide under conditions similar to those described in Example 1 or 2. The new compound boils at 161° C. under a pressure of 1 millimeter (mercury gauge) and crystallizes when allowed to stand for a long period. After crystallization from ammoniacal methanol, it melts at from 72° to 78° C.

Example 4

10 parts of acetylene are added on to 100 parts of alpha-alpha'-dinaphthylamine at 190° C. while adding 3 parts of potassium hydroxide. N-vinyl-alpha-alpha'-dinaphthylamine is thus obtained in the form of a brown mass.

Example 5

Acetylene is caused to act in the manner described in the foregoing examples on a mixture of 50 parts of diphenylamine, 50 parts of xylene and 1.5 parts of potassium hydroxide. The amount of acetylene necessary for the formation of the vinyl compound has been absorbed after about seven hours. The solvent is then distilled off from the brown liquid. The residue consists of N-vinyl-diphenylamine which may be purified in the usual manner.

What I claim is:—

1. The process of producing N-vinyl compounds which comprises reacting acetylene at a temperature between about 100° and about 200° C. with secondary diarylamines free from hydroxy groups in the presence of a substance selected from the group consisting of the alkali metals and the alkali metal compounds having a strongly alkaline reaction.

2. The process of producing N-vinyl compounds which comprises reacting acetylene at a temperature between about 100° and about 200° C. with secondary diarylamines free from hydroxy groups in the presence of a substance selected from the group consisting of the alkali metals and the alkali metal compounds having a strongly alkaline reaction and in the presence of tertiary heterocyclic bases.

3. The process of producing N-vinyl compounds which comprises reacting acetylene at a temperature between about 100° and about 200° C. with secondary diarylamines free from hydroxy groups in the presence of potassium hydroxide.

4. The process of producing N-vinyl compounds which comprises reacting acetylene at a temperature between about 100° and about 200° C. with secondary diarylamines free from hydroxy groups in the presence of a substance selected from the group consisting of the alkali metals and the alkali metal compounds having a strongly alkaline reaction and in the presence of organic diluents.

5. The process of producing N-vinyl compounds which comprises reacting acetylene at a temperature between about 100° C. and about 200° C. and under a pressure of between about 15 and about 25 atmospheres with secondary diarylamines free from hydroxy groups in the presence of a substance selected from the group consisting of the alkali metals and the alkali metal compounds having a strongly alkaline reaction.

6. N-vinyl-diarylamines.
7. N-vinyl-diphenylamine.
8. N-vinyl-phenyl-beta-naphthylamine.
9. N-vinyl-alpha-alpha'-dinaphthylamine.

WERNER WOLFF.